(12) United States Patent
Huras et al.

(10) Patent No.: US 7,725,446 B2
(45) Date of Patent: May 25, 2010

(54) COMMITMENT OF TRANSACTIONS IN A DISTRIBUTED SYSTEM

(75) Inventors: Matthew Albert Huras, Ajax (CA); Timothy Jon Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 11/312,994

(22) Filed: Dec. 19, 2005

(65) Prior Publication Data

US 2007/0143299 A1    Jun. 21, 2007

(51) Int. Cl.
*G06F 17/00* (2006.01)

(52) U.S. Cl. ............... 707/703; 709/200; 709/226

(58) Field of Classification Search .......... None
See application file for complete search history.

(56) References Cited

U.S. PATENT DOCUMENTS

| 6,510,421 | B1 | 1/2003 | Ganesh et al. |
| 6,564,215 | B1 * | 5/2003 | Hsiao et al. ................. 707/8 |
| 6,684,223 | B1 | 1/2004 | Ganesh et al. ............. 707/200 |
| 6,845,384 | B2 | 1/2005 | Bamford et al. .......... 707/205 |
| 7,076,553 | B2 * | 7/2006 | Chan et al. ................ 709/226 |
| 7,100,076 | B2 * | 8/2006 | Johnson et al. ............... 707/8 |
| 2004/0148289 | A1 | 7/2004 | Bamford et al. ........... 707/10 |

FOREIGN PATENT DOCUMENTS

EP    0772136 B1    5/1997

* cited by examiner

*Primary Examiner*—Cheyne D Ly
*Assistant Examiner*—Jau-Shya Meng
(74) *Attorney, Agent, or Firm*—Sawyer Law Group P.C.

(57) ABSTRACT

A method for committing transactions in a distributed system are provided. The method provides for receiving a request from a client to commit a transaction at a coordinator node in the distributed system, tracking a tail log sequence number for every other node in the distributed system, determining a max log sequence number associated with the transaction for each participant node in the distributed system, and committing the transaction at the coordinator node when the tail log sequence number for each participant node is greater than or equal to the max log sequence number associated with the transaction at the respective participant node.

19 Claims, 7 Drawing Sheets

COMMITMENT OF TRANSACTIONS IN A DISTRIBUTED SYSTEM

FIELD OF THE INVENTION

The present invention relates generally to distributed systems. More particularly, the present invention is directed to commitment of transactions in a distributed system.

BACKGROUND OF THE INVENTION

A distributed system is a multi-node system in which data is stored in various databases. Nodes can be any data processing system, such as a computer system. Although each database can only be accessed through one node, more than one database may be accessible through a node in the distributed system. The nodes in a distributed system can be connected to one another through a network, such as a local area network (LAN) or a wide area network (WAN). In addition, nodes in a distributed system may be in one location or spread out over multiple locations. Examples of distributed systems include database systems, mail server systems, etc.

Since a transaction, which consists of a set of requests that results in a single logical action, can modify data on multiple databases in a distributed system, the distributed system must ensure that data consistency is maintained, regardless of whether or not failures (e.g., power outages, hardware crashes, etc.) occur. Hence, each requested operation in a transaction must be "committed," i.e., changes to data become persistent, before the transaction can be committed. A data change becomes persistent when a log record of the data change is "flushed," i.e., written, to non-volatile storage (e.g., disk drive). Log records allow a node to restore a database to its pre-failure state by replaying the operations that committed prior to failure.

Traditionally, distributed systems have utilized a two-phase commit (2PC) protocol to preserve consistency of data. In a 2PC system, a coordinator node for each transaction, i.e., the node where a client (e.g., an application) submitted the transaction, identifies, for each request in the transaction, a node in the distributed system responsible for handling the request. Each node assigned to handle a request in the transaction is referred to as a participant node.

Each participant node in a two-phase commit protocol votes whether to commit or abort the transaction and sends its vote to the coordinator node. The coordinator node then makes the final decision on whether to commit or abort the transaction based on the vote from each participant node. A transaction will only be committed by the coordinator node if all of the participant nodes vote to commit the transaction. Otherwise, the coordinator node will abort the transaction.

The two-phase commit protocol, however, is not really message efficient because during phase one, the coordinator node sends a message to each participant node to prepare to commit the transaction. Each participant node then decides whether it can commit the requested operation(s) and sends a message back to the coordinator node with its vote on whether to commit or abort the transaction. In the second phase, the coordinator node decides whether to commit or abort the transaction based on all of the votes it received from the participant nodes and sends a message to each participant node to commit or abort the transaction.

Another commit protocol employed by distributed systems is a two-interval commit (2IC), discussed in U.S. Pat. No. 5,799,305, entitled "Method of Commitment in a Distributed Database Transaction," which is hereby incorporated in its entirety for all purposes. The 2IC system uses interval messages that are sent in succession from an interval coordinator to determine whether to commit or abort a transaction. Thus, although a 2IC system requires less messaging than a 2PC system, it is still more message-intensive than necessary.

Accordingly, there is a need for a distributed transaction commitment protocol that is more message efficient than current commitment protocols. The present invention addresses such a need.

SUMMARY OF THE INVENTION

A method for committing transactions in a distributed system is provided. The method provides for receiving a request from a client to commit a transaction at a coordinator node in the distributed system, the distributed system comprising one or more participant nodes, tracking a tail log sequence number for each of all other nodes in the distributed system, each tail log sequence number approximating a last transaction log record flushed by the respective node, wherein at least one of the all other nodes is a participant node, determining a max log sequence number associated with the transaction for each of the one or more participant nodes, each max log sequence number corresponding to a highest transaction log record required for the transaction at the respective participant node, and committing the transaction at the coordinator node when the tail log sequence number for each of the one or more participant nodes is greater than or equal to the max log sequence number associated with the transaction at the respective participant node.

DETAILED DESCRIPTION

The present invention relates generally to distributed systems and more particularly to commitment of transactions in a distributed system. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

Figure 1:
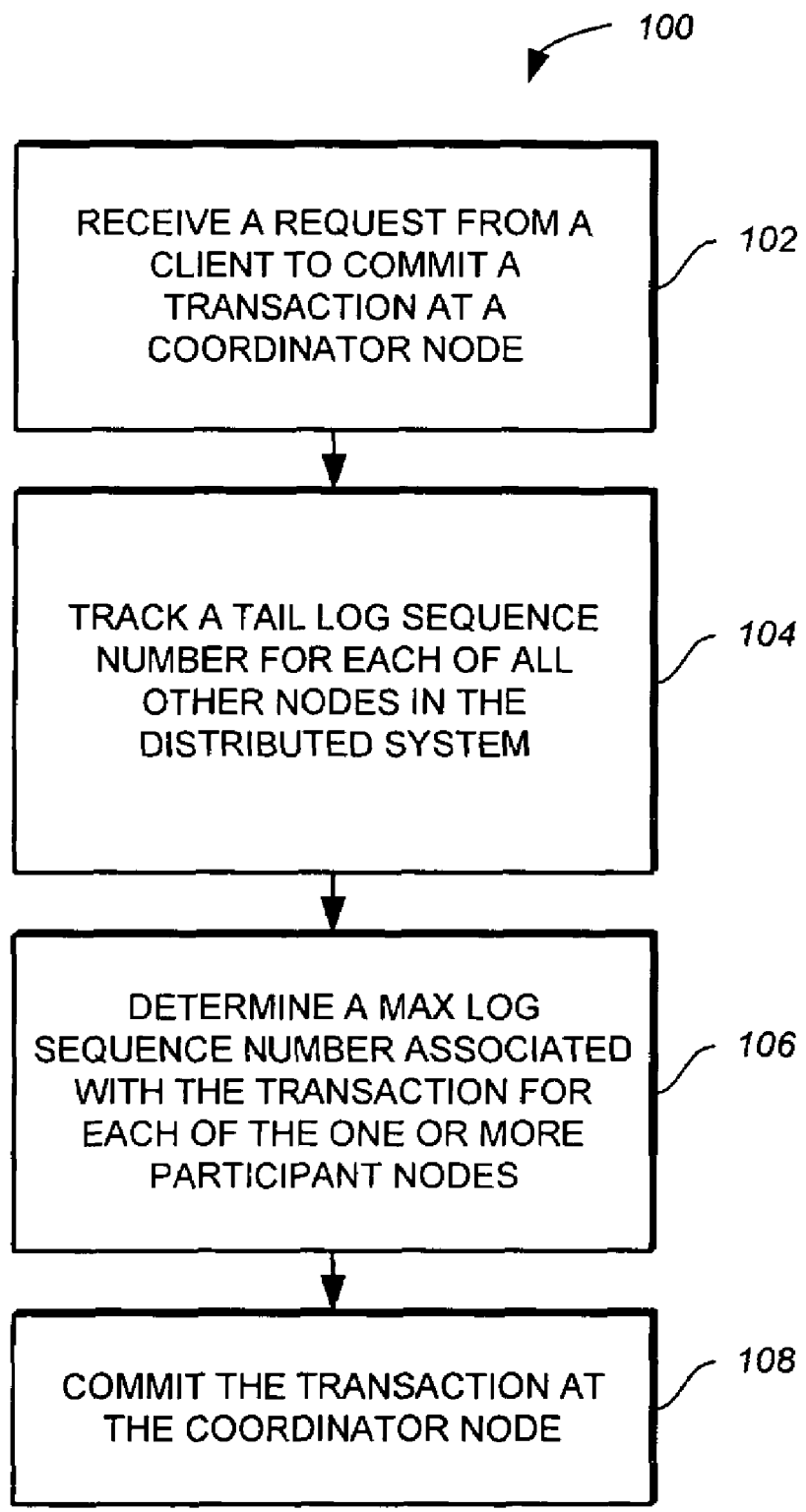
FIG. 1 is a process flow of a method for committing transactions in a distributed system according to an aspect of the invention.

FIG. 1 depicts a process 100 for committing transactions in a distributed system according to an aspect of the invention. At 102, a request to commit a transaction is received from a client at a coordinator node in the distributed system. A client can be an application or a process and may be located on the coordinator node or some other node. The coordinator node is usually where the transaction was initialized, i.e., where the client submitted a request to begin the transaction. The distributed system comprises all participant nodes participating in the transaction, and there may be one or more participant nodes in the distributed system. In some embodiments, the coordinator node may also be a participant node.

At 104, a tail log sequence number for every other node in the distributed system is tracked (at the coordinator node). It is clear that at least one other node is a participant node in the distributed system. Each node in the distributed system keeps a log of all of the requests which are fulfilled by that node. Log records are usually first created in volatile memory, i.e., memory susceptible to failures, such as random access memory (RAM). When a node is ready to commit a requested operation, it will "flush," i.e., write, the log record associated with the requested operation to non-volatile memory, such as a hard disk. Flushing the log record permits the node to re-perform the requested operation if a failure occurs sometime thereafter. Each tail log sequence number approximates a last transaction log record flushed by the respective node.

A max log sequence number associated with the transaction is then determined for each of the one or more participant nodes at 106. There are usually multiple requests within a single transaction. Since each participant node may be assigned to handle more than one of the requests and each request has a separate log record, each max log sequence number corresponds to a highest transaction log record required for the transaction at the respective participant node (i.e., the log sequence number of the transaction log record corresponding to the last requested operation executed by the respective participant node for the transaction). Because each node's log is unique to the node, a log sequence number at one node will usually correspond to a different transaction than the same log sequence number at another node.

The transaction is committed at the coordinator node when the tail log sequence number for each of the one or more participant nodes is greater than or equal to the max log sequence number associated with the transaction at the respective participant node (108). This ensures that each participant node has committed its respective transaction request(s) before the transaction is committed at the coordinator node, which preserves data consistency.

Figure 2A:
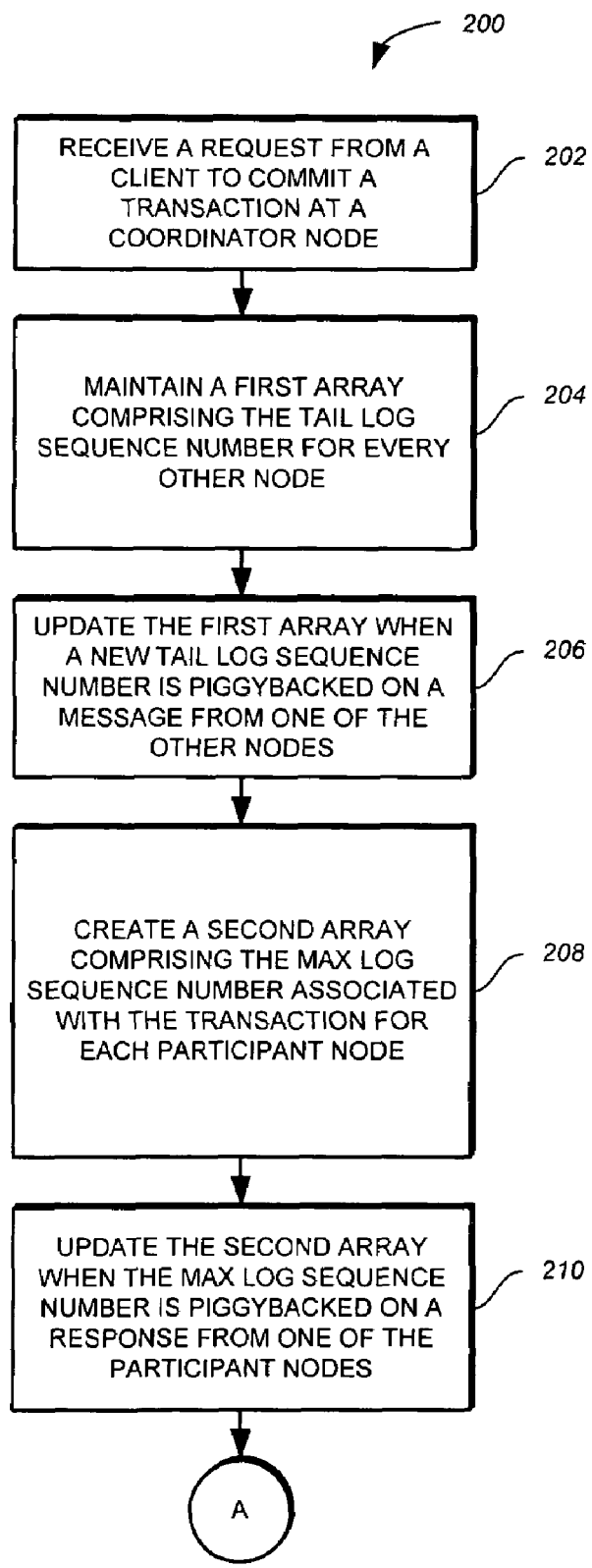
FIGS. 2A-2B illustrate flowcharts of a method for committing transactions in a distributed system in accordance with one implementation of the invention.
Figure 2B:
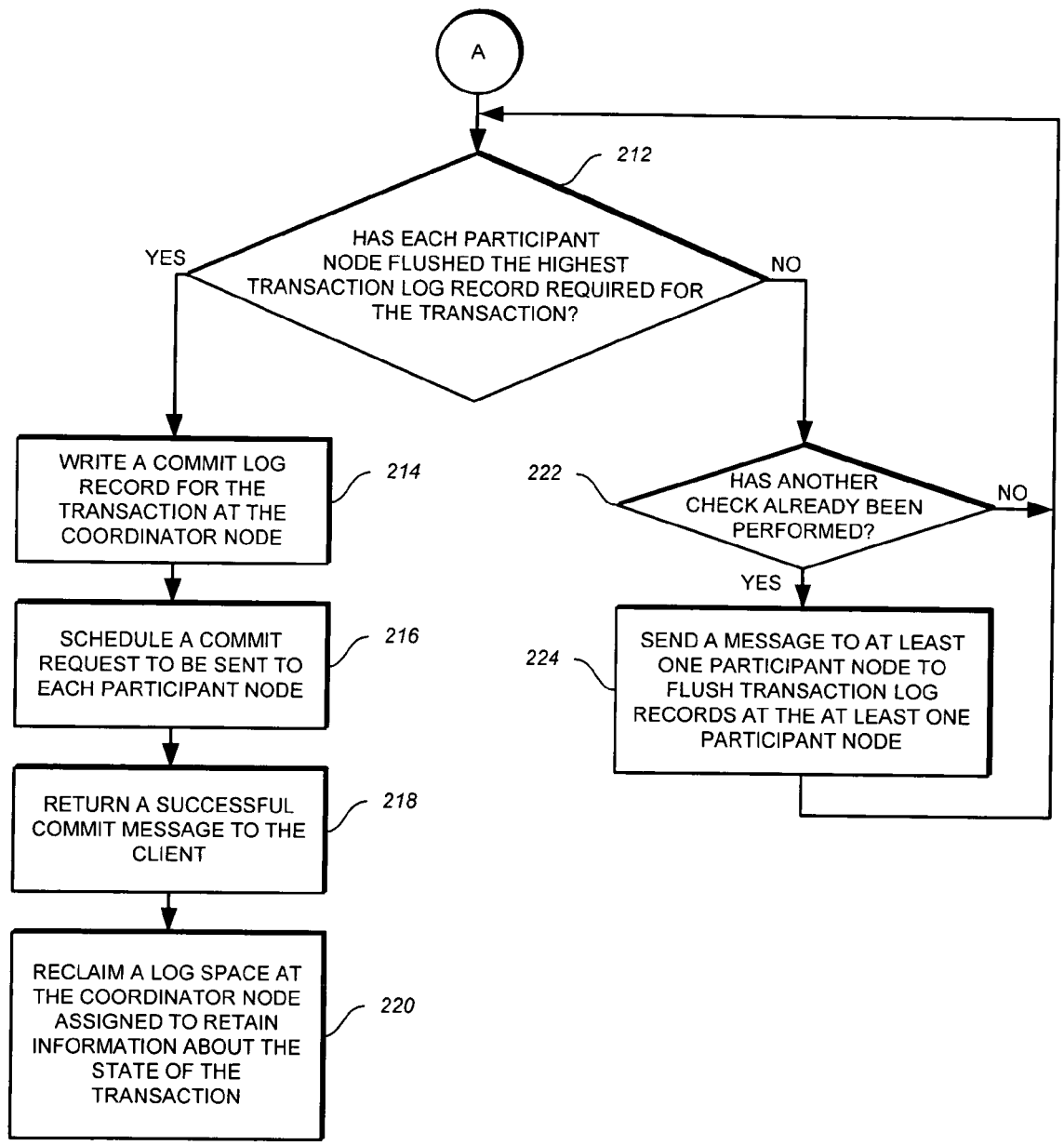

Illustrated in FIGS. 2A-2B is a process 200 for committing transactions in a distributed system in accordance with an embodiment of the invention. A request to commit a transaction is received from a client at a coordinator node in the distributed system at 202. When the commit request is submitted, the client has typically already submitted many other requests, such as requests to modify, delete, or insert data, to the coordinator node, which then forwarded those requests onto one or more participant nodes in the distributed system participating in the transaction.

A first array comprising an entry for each of the other nodes in the distributed system is maintained at the coordinator node (204). Each entry is operably configured to store a tail log sequence number for the respective other node. At 206, the first array is updated when a new tail log sequence number is piggybacked on a message from one of the other nodes. A message may include one or more responses, one or more requests, or a combination of the two. This results in a significant reduction is messaging traffic because the tail log sequence number is included along with a message one node was already going to send to another node, rather than being sent in a new, separate message. In addition, the cost of adding the tail log sequence number to an existing message is very low, usually only a few extra bytes.

In some implementations, the tail log sequence number sent by a node is not the actual last transaction log record flushed by the node, but rather some earlier transaction log record. This helps minimize contention for resources, such as memory, on the node because it allows more time for resources allocated to other transactions to be unlocked or unlatched.

A second array for the transaction is created at 208. The second array comprises an entry for each of the one or more participant nodes, where each entry is operably configured to store the max log sequence number associated with the transaction for the respective participant node. At 210, the second array is updated when the max log sequence number associated with the transaction is piggybacked on a response from one of the one or more participant nodes. By piggybacking the max log sequence numbers on responses the one or more participant nodes were already going to send to the coordinator node, messaging traffic is further reduced.

The second array is then compared to the first array to determine whether each of the one or more participant nodes has flushed the highest transaction log record required for the transaction at the respective participant node (212). When each of the one or more participant nodes has flushed the highest transaction log record required for the transaction at the respective participant node, a commit log record for the transaction is written at the coordinator node (214), a commit request is scheduled to be sent to each of the one or more participant nodes along with another message already scheduled to be sent to the respective participant node (216), and a successful commit message is returned to the client (218).

Messaging traffic is again improved by sending commit requests to each participant node via another message already scheduled to be sent to the respective participant node. Once a participant node receives the commit request, it will perform local commit processing, such as unlocking resources reserved for the transaction and writing a commit log record for the transaction. Once a participant node completes local commit processing, it will send a response to the coordinator node that it has committed the transaction locally. The response may be piggybacked on an unrelated message being sent from the participant node to the coordinator node to further reduce messaging traffic. Once the coordinator node receives a response back from each participant node, it will reclaim a log space at the coordinator node assigned to retain information about the state of the transaction (220). The information may include the identity of each participant node, etc.

When the tail log sequence number for at least one of the one or more participant nodes is less than the max log sequence number associated with the transaction at the least one participant node, a determination is made as to whether another check had already been made (222). If no other check has been made, the coordinator node may wait with a timeout before checking again. On the other hand, if another check has already been made, a message is sent to the at least one participant node to flush one or more transaction log records at the at least one participant node (224).

In some embodiments, the coordinator node will simply wait to check again after sending the message to flush one or more transaction log records. In other embodiments, the message may include the log sequence number to be flushed and a response request. The coordinator node will then will wait for the response before proceeding. The need to actively send a request to a participant node to flush one or more transaction records should be a rare occurrence as a distributed system typically handles so many transactions that there are plenty of messages being sent between nodes to allow the tail log sequence numbers to be updated frequently.

It is possible that a participant node performing crash recovery will not see any commit request, even though the transaction has been committed. Under those circumstances, the participant node performing crash recovery will communicate to the coordinator node to determine the state of the transaction and commit or abort, accordingly. The coordinator node will still remember the state of the transaction since it will not reclaim the log space assigned to retain information about the state of the transaction until it has received a response back from each participant node that the respective participant node committed the transaction locally.

Certain transactions may include requests that do not modify, delete, or insert data, such as pre-fetching (i.e., read-ahead) requests. These requests are usually asynchronous and sometimes they encounter lock timeouts or deadlocks. A deadlock can occur when a first transaction has been allocated resource A and is waiting for the allocation of resource B, but at the same time, a second transaction has been allocated resource B and is waiting for the allocation of resource A.

When a deadlock occurs on a node, the node will usually try to rollback one of the transactions after a lock timeout. However, in a distributed transaction, if the node is a participant node, it must ask the coordinator node for permission to rollback. In some embodiments, the coordinator node will grant the rollback permission if it is not already processing commit, as described above, and inform any other participant node to rollback. Otherwise, the coordinator node will prevent the participant node from performing a rollback.

Figure 3A:
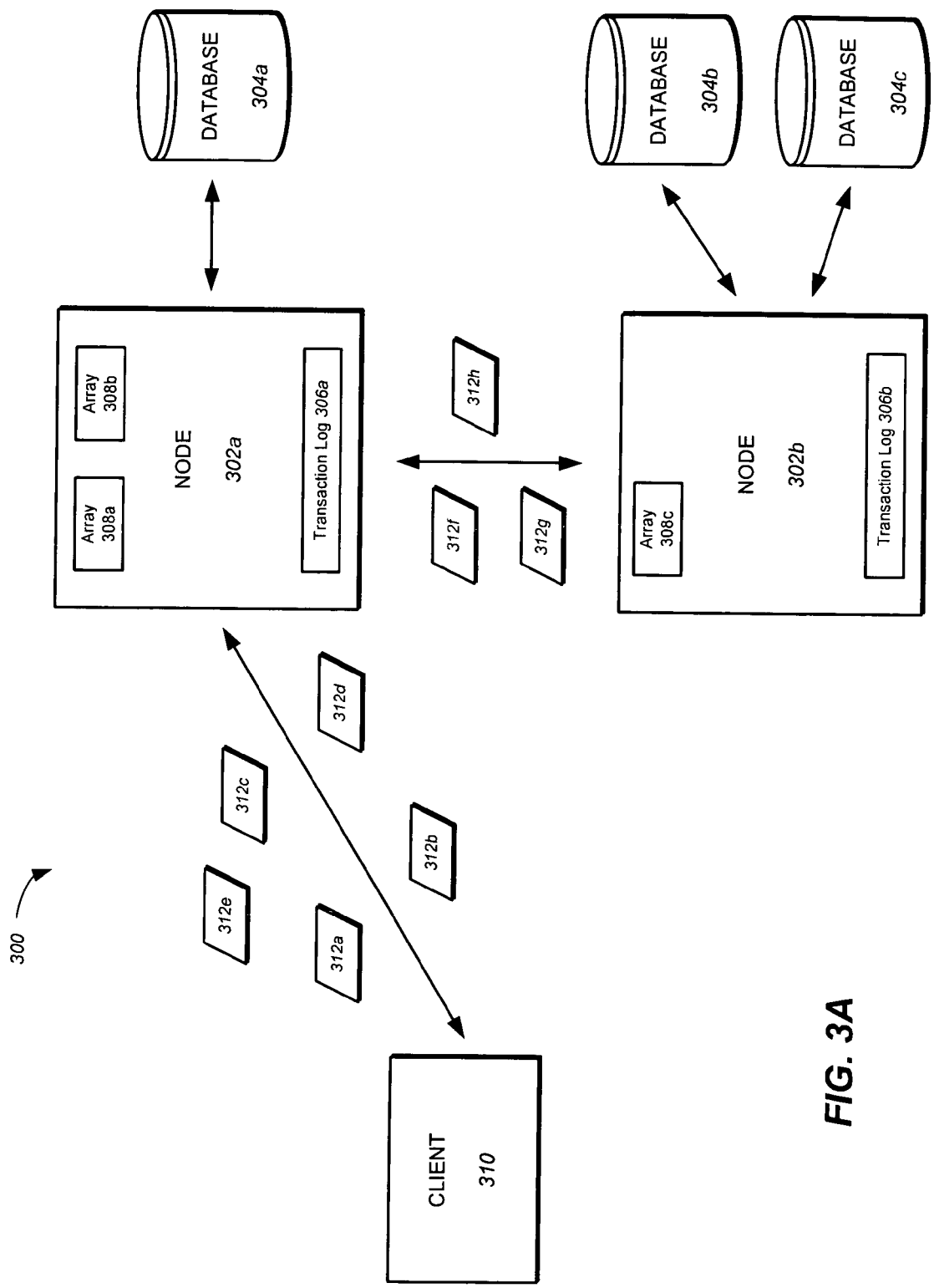
FIGS. 3A-3B depict a distributed system according to an embodiment of the invention
Figure 3B:
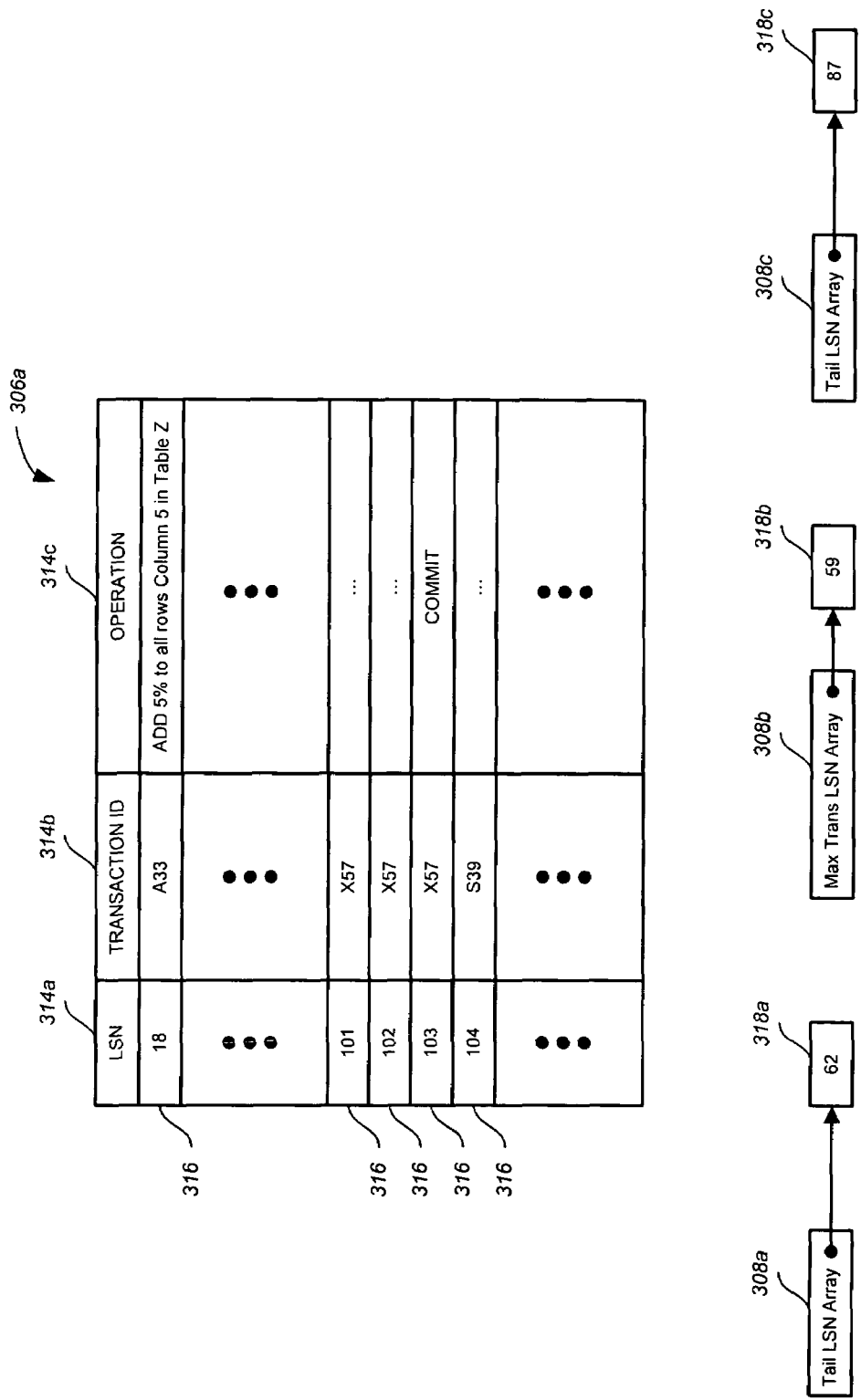

FIGS. 3A-3B show a distributed system 300 according to an implementation of the invention. Distributed system 300 includes nodes 302a and 302b. Node 302a is coupled to a database 304a and node 302b is coupled to databases 304b and 304c. Transaction logs 306a and 306b are maintained on nodes 302a and 302b, respectively. An exemplary transaction log 306a can be seen in FIG. 3B. Exemplary transaction log 306a includes a log sequence number (LSN) column 314a, a transaction ID column 314b, an operation column 314c, and a plurality of rows (i.e., records) 316. Transaction logs in other embodiments may be different with more or less columns, different columns, different information, etc.

Nodes 302a and 302b also include arrays 308a and 308c. As seen in FIG. 3B, arrays 308a and 308c are Tail LSN Arrays each with only one entry 318a and 318c since distributed system 300 only shown with nodes 302a and 302b in FIG. 3A. In the embodiment, entry 318a is an approximation of the last transaction log record flushed by node 302b and entry 318c is an approximation of the last transaction log record flushed by node 302a.

A Max Trans LSN Array 308b is included in node 302a as a client 310 has submitted a transaction to node 302a, in which node 302b is a participant node. Client 310 may be an application or process residing on node 302a, node 302b, or some other node (not shown) within or outside of distributed system 300. Max Trans LSN Array 308b includes an entry 318b for the highest transaction log record required for the transaction at node 302b. Messages 312a-h are illustrated in FIG. 3A to show the messaging between client 310, node 302a, and node 302b.

Figure 4:
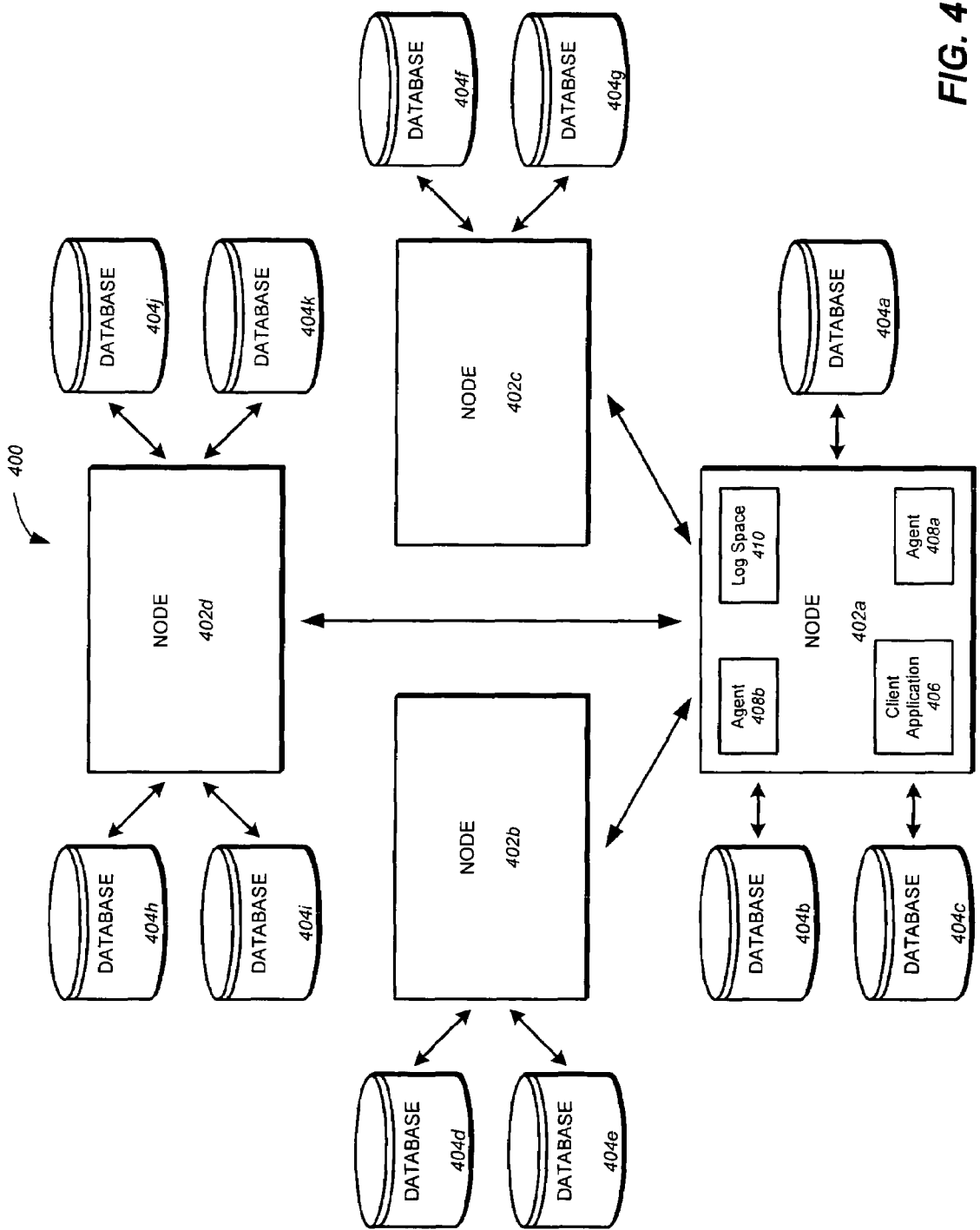
FIG. 4 shows a distributed system in accordance with another aspect of the invention.

Depicted in FIG. 4 is a distributed system 400 for in accordance with another aspect of the invention. Distributed system 400 includes nodes 402a-d and databases 404a-k. A client application 406 is running on node 402a. Node 402a also includes a log space 410 for storing log records and agents 408a-b to coordinate transactions. Agents 408a-b may be tasks or processes running on node 402a. In some embodiments of the invention, one agent is used to handle execution of a transaction and another agent may be used to handle commitment of the transaction.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 5:
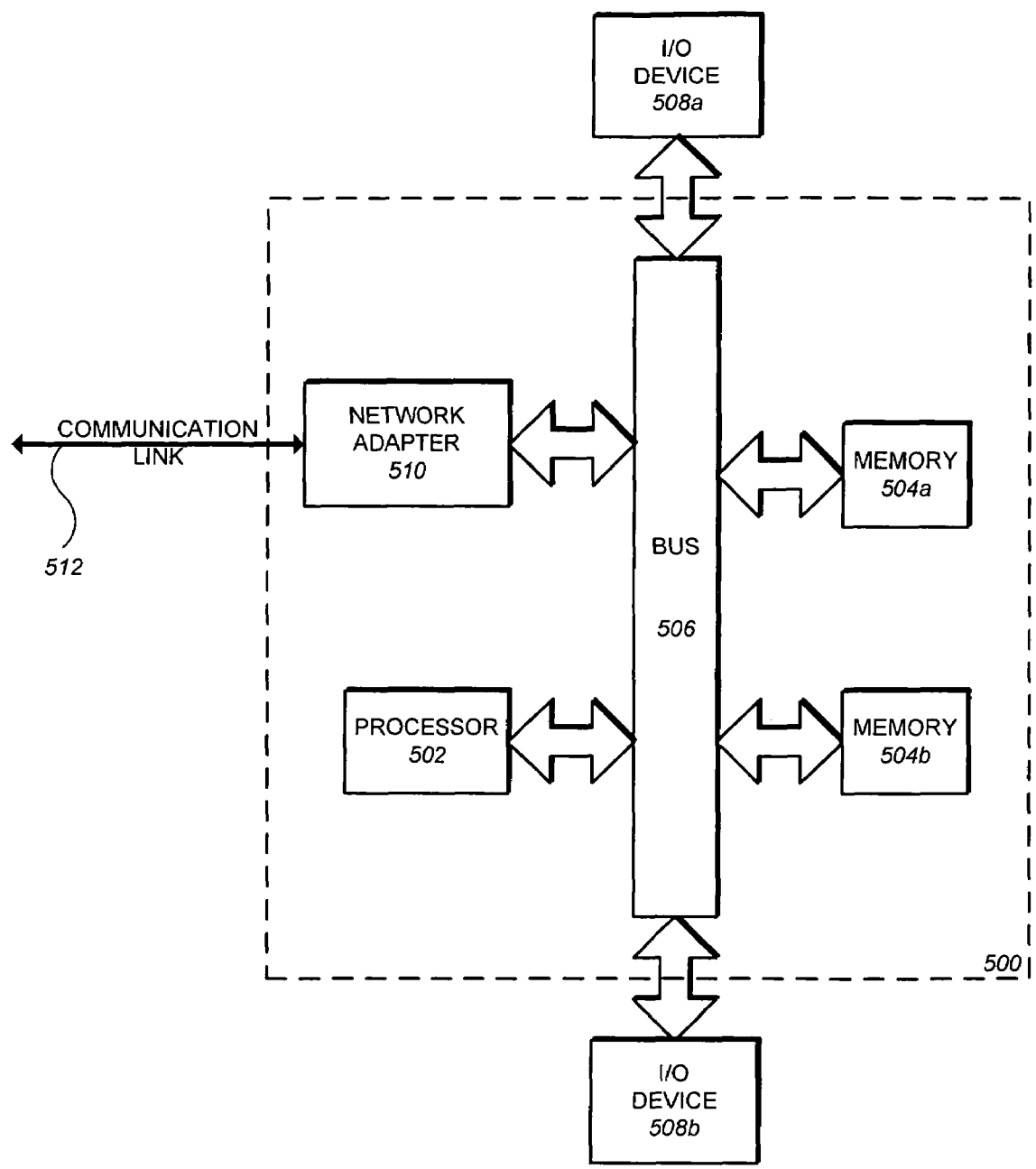
FIG. 5 is a block diagram of a data processing system with which embodiments of the present invention can be implemented.

FIG. 5 illustrates a data processing system 500 suitable for storing and/or executing program code. Data processing system 500 includes a processor 502 coupled to memory elements 504a-b through a system bus 506. In other embodiments, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the embodiment, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

By piggybacking communications between nodes regarding tail log sequence numbers, max log sequence numbers, commit requests, and/or local commit confirmations on other existing messages, messaging traffic in distributed systems may be greatly reduced. This reduction in messaging traffic results in quicker transaction commit times and may allow for the use of lower cost systems, such as a less powerful network, while maintaining comparable performance.

Various implementations for committing transactions in a distributed system have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A computer processor implemented method of committing transactions in a distributed system, the computer processor performing the following method steps:
   receiving a request from a client to commit a transaction at a coordinator node in the distributed system, the distributed system comprising one or more participant nodes;
   tracking a tail log sequence number for each of all other nodes in the distributed system, each tail log sequence number being associated with a last transaction log record flushed by a respective node, wherein at least one node of the all other nodes is a participant node, wherein tracking the tail log sequence number for each of the all other nodes in the distributed system comprises
   maintaining a first array comprising an entry for each of the all other nodes in the distributed system, each entry being configured to store the tail log sequence number for a respective other node; and
   updating the first array only when a new tail log sequence number is piggybacked on a message from one node of the all other nodes;
   determining a max log sequence number associated with the transaction for each of one or more participant nodes, each max log sequence number corresponding to a highest transaction log record required for the transaction at a respective participant node, wherein determining the max log sequence number associated with the transaction for each of the one or more participant nodes comprises
   creating a second array for the transaction, the second array comprising an entry for each of the one or more participant nodes, wherein each entry is configured to store the max log sequence number associated with the transaction for the respective participant node;
   updating the second array only when the max log sequence number associated with the transaction is piggybacked on a response from one node of the one or more participant nodes;
   comparing the first array to the second array to determine whether each of the one or more participant nodes has flushed the highest transaction log record required for the transaction at a respective participant node; and
   committing the transaction at the coordinator node when the tail log sequence number for each of the one or more participant nodes is greater than or equal to the max log sequence number associated with the transaction at the respective participant node.

2. The method of claim 1, wherein the new tail log sequence number is not the most current transaction log record flushed by the node and the message comprises one or more responses, one or more requests, or at least one response and at least one request.

3. The method of claim 1, wherein committing the transaction at the coordinator node comprises:
   comparing the second array to the first array to determine whether each of the one or more participant nodes has flushed the highest transaction log record required for the transaction at the respective participant node;
   writing a commit log record for the transaction at the coordinator node when each of the one or more participant nodes has flushed the highest transaction log record required for the transaction at the respective participant node;
   scheduling a commit request to be sent to each of the one or more participant nodes along with another message already scheduled to be sent to the respective participant node when each of the one or more participant nodes has flushed the highest transaction log record required for the transaction at the respective participant node; and
   returning a successful commit message to the client when each of the one or more participant nodes has flushed the highest transaction log record required for the transaction at the respective participant node.

4. The method of claim 3, further comprising:
   reclaiming a log space at the coordinator node assigned to retain information about the state of the transaction when a response is received from each of the one or more participant nodes specifying that the transaction has been committed at the respective participant node.

5. The method of claim 4, wherein each response is piggybacked on an unrelated message being sent from the respective participant node to the coordinator node.

6. The method of claim 1, wherein a first agent on the coordinator node handles execution of the transaction and a second agent on the coordinator node handles commitment of the transaction.

7. The method of claim 1, further comprising:
   sending a message to at least one participant node to flush one or more transaction log records at the at least one participant node when the tail log sequence number for the at least one participant node is less than the max log sequence number associated with the transaction at the at least one participant node.

8. The method of claim 1, wherein the last transaction record flushed is an earlier transaction log record.

9. A computer program product on a computer-readable storage medium containing a plurality of executable program instructions for committing transactions in a distributed system, the instructions executed by a processor perform:
   receive a request from a client to commit a transaction at a coordinator node in the distributed system, the distributed system comprising one or more participant nodes;
   track a tail log sequence number for each of all other nodes in the distributed system, each tail log sequence number being associated with a last transaction log record flushed by a respective node, wherein at least one node of the all other nodes is a participant node, wherein tracking the tail log sequence number for each of the all other nodes in the distributed system comprises
   maintaining a first array comprising an entry for each of the all other nodes in the distributed system, each entry being configured to store the tail log sequence number for a respective other node; and
   update the first array only when a new tail log sequence number is piggybacked on a message from one node of the all other nodes;
   determine a max log sequence number associated with the transaction for each of one or more participant nodes, each max log sequence number corresponding to a highest transaction log record required for the transaction at a respective participant node, wherein determining the max log sequence number associated with the transaction for each of the one or more participant nodes comprises
   create a second array for the transaction, the second array comprising an entry for each of the one or more participant nodes, wherein each entry is configured to store the max log sequence number associated with the transaction for the respective participant node;

update the second array only when the max log sequence number associated with the transaction is piggybacked on a response from one node of the one or more participant nodes;

compare the first array to the second array to determine whether each of the one or more participant nodes has flushed the highest transaction log record required for the transaction at a respective participant node; and commit the transaction at the coordinator node when the tail log sequence number for each of the one or more participant nodes is greater than or equal to the max log sequence number associated with the transaction at the respective participant node.

10. The product of claim 9, wherein the new tail log sequence number is not the most current transaction log record flushed by the node and the message comprises one or more responses, one or more requests, or at least one response and at least one request.

11. The product of claim 9, wherein the instructions when executed on the computer further causes the computer to:

reclaim a log space at the coordinator node assigned to retain information about the state of the transaction when a response is received from each of the one or more participant nodes specifying that the transaction has been committed at the respective participant node, wherein each response is piggybacked on an unrelated message being sent from the respective participant node to the coordinator node.

12. The product of claim 9, wherein a first agent on the coordinator node handles execution of the transaction and a second agent on the coordinator node handles commitment of the transaction.

13. The product of claim 9, wherein the instructions when executed on the computer further causes the computer to:

send a message to at least one participant node to flush one or more transaction log records at the at least one participant node when the tail log sequence number for the at least one participant node is less than the max log sequence number associated with the transaction at the at least one participant node.

14. A distributed data processing system of the plurality of system nodes being a respective data processing system where at least comprising:

a plurality of databases; and a plurality of nodes connected to one another, each of the plurality of nodes being a data processing system, where at least one of the plurality of nodes is a client at a coordinator node, each data processing system including a processor coupled to one or more memory elements through a respective system bus of the data processing system and at least one input and at least one output device, each of the plurality nodes being coupled to one or more of the plurality of databases, wherein at least one of the plurality of nodes is configured to:

receive a request from the client to commit a transaction at the coordinator node in the distributed system, the distributed system comprising one or more participant nodes;

track a tail log sequence number for each of all other nodes in the distributed system, each tail log sequence number being associated with a last transaction log record flushed by a respective node, wherein at least one node of the all other nodes is a participant node, wherein tracking the tail log sequence number for each of the all other nodes in the distributed system comprises maintaining a first array comprising an entry for each of the all other nodes in the distributed system, each entry being configured to store the tail log sequence number for a respective other node; and update the first array only when a new tail log sequence number is piggybacked on a message from one node of the all other nodes;

determine a max log sequence number associated with the transaction for each of one or more participant nodes, each max log sequence number corresponding to a highest transaction log record required for the transaction at a respective participant node, wherein determining the max log sequence number associated with the transaction for each of the one or more participant nodes comprises create a second array for the transaction, the second array comprising an entry for each of the one or more participant nodes, wherein each entry is configured to store the max log sequence number associated with the transaction for the respective participant node;

update the second array only when the max log sequence number associated with the transaction is piggybacked on a response from one node of the one or more participant nodes;

compare the first array to the second array to determine whether each of the one or more participant nodes has flushed the highest transaction log record required for the transaction at a respective participant node; and commit the transaction at the coordinator node when the tail log sequence number for each of the one or more participant nodes is greater than or equal to the max log sequence number associated with the transaction at the respective participant node.

15. The system of claim 14, wherein the new tail log sequence number is not the most current transaction log record flushed by the node and the message comprises one or more responses, one or more requests, or at least one response and at least one request.

16. The system of claim 14, wherein the coordinator node is further operatively configured to:

reclaim a log space at the coordinator node assigned to retain information about the state of the transaction when a response is received from each node of the one or more participant nodes specifying that the transaction has been committed at the respective participant node, wherein each response is piggybacked on an unrelated message being sent from the respective participant node to the coordinator node.

17. The distributed system of claim 14, wherein a first agent on the coordinator node handles execution of the transaction and a second agent on the coordinator node handles commitment of the transaction and the coordinator node is further operable to:

send a message to at least one participant node to flush one or more transaction log records at the at least one participant node when the tail log sequence number for the at least one participant node is less than the max log sequence number associated with the transaction at the at least one participant node.

18. The system of claim 14, wherein, for each tail log sequence number, the last transaction record flushed by the respective node and being associated therewith is not an actual last transaction log record flushed by the respective node.

19. The system of claim 14, wherein the last transaction record flushed is an earlier transaction log record.

* * * * *